United States Patent Office 3,130,224
Patented Apr. 21, 1964

3,130,224
MANUFACTURING METHOD OF ALKYLENE-
DICYANAMIDE
Kiichiro Sugino, Shinjuku-ku, Kozo Shirai, Shinagawa-ku, and Rokuro Kitawaki, Mitaka-shi, Tokyo, Japan, assignors to Nippon Carbide Kogyo Kabushiki Kaisha, Tokyo, Japan, a corporation of Japan
No Drawing. Filed Oct. 26, 1961, Ser. No. 147,764
5 Claims. (Cl. 260—551)

The invention relates to a method of manufacturing alkylenedicyanamide.

Alkylenedicyanamide is a rarely known substance. The only mention of any substance similar to this is the hexamethylenedicyanamide mentioned in H. Dreyfus' British Patent No. 549,368 (1942), U.S. Patent No. 2,349,851 (1944).

Regretfully, however, it has been discovered that the hexamethylenedicyanamide mentioned in the said patent is not the true substance it claims to represent.

According to the patent, hexamethylenedicyanamide is reported as a yellow-colored viscous liquid which has a boiling point of 150–155° C. at 50 mm. Hg.

However, the inventors, after reacting hexamethylenediamine with cyanogen bromide carefully by the following method, obtained a substance completely different from the hexamethylenedicyanamide mentioned in the said patent.

The new substance is a white-colored crystal with a melting point of 64–65° C. and is easily polymerized at a temperature above the melting point.

However, applicants would like to point out that this new compound of this invention has the following useful applications. The alkylenedicyanamides can be mutually polymerized and this obtained polymer is exceedingly hard, lustrous, colorless and transparent. This polymer has strong resistance against water, chemicals, light, fire and is a good insulator. The polymers were found to be very useful in the manufacture of adhesives, films and plastics (moulding articles). Alkylenedicyanamide is also useful as a good synthetic raw material for the production of alkylenediguanidines, for example, decamethylenediguanidine which is effective for reducing blood sugar in the human body.

Consequently, even several grams of this substance will polymerize explosively with spontaneous heat evolution under conditions of 150–155° C. at 50 mm. Hg. Therefore, it is entirely impossible to distill this substance.

In order to reconfirm the true nature of this substance, the inventors have carried out the following studies on its structure by means of elemental analysis, measurements of molecular weight and infrared spectrum and also by means of hydrolysis with acid and reaction with ammonium salt.

*Elemental analysis.*—Calculated value of $C_8H_{14}N_4$: C, 57.80%; H, 8.49; N, 33.71%. Found: C, 57.82%; H, 8.71%; N, 33.71%. Molecular weight (cryoscopic in tertiary butylalcohol): Calculated value, 166.23. Found, 163, 170.

An infrared spectrum indicated a very distinct adsorption at 2200 cm.$^{-1}$, pointing to the presence of nitrile group. It also indicated the presence of imino group bands at 3220–3240 cm.$^{-1}$ and of methylene group bands at 2920, 2860, 1470 and 740 cm.$^{-1}$.

Hydrolysis with 1 N hydrochloric acid: Product—Hexamethylenediurea (M.P. 197–198° C.).

Calculated for $C_8H_{18}N_4O_2$: N, 27.70%. Found: N, 27.78%.

Reaction with ammonium nitrate: Product—Hexamethylenediguanidine dinitrate (M.P. 213° C.).

A mixed melting point with authentic sample (obtained by the procedure of K. Odo and K. Sugino, J. Chem. Soc. Japan, 63, 336 (1942)), gave no depression.

Calculated for $C_8H_{22}N_8O_6$: C, 29.45%; H, 6.80%; N, 34.34%. Found: C, 29.47%; H, 6.80%; N, 34.21%.

As is clear from the above results, it was confirmed that the above mentioned substance was true hexamethylenedicyanamide. Thus, the inventors claim that they were the first to synthesize pure hexamethylenedicyanamide and also succeeded in newly synthesizing various types of alkylenedicyanamide.

The general formula for alkylenedicyanamide is

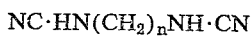

$$NC \cdot HN(CH_2)_n NH \cdot CN$$

($n$ is integral number). The compounds, for example, are tetramethylenedicyanamide, pentamethylenedicyanamide, hexamethylenedicyanamide, heptamethylenedicyanamide, octamethylenedicyanamide, nonamethylenedicyanamide and decamethylenedicyanamide.

These compounds can be synthesized by reacting cyanogen halide (BrCN, ClCN, ICN) with alkylenediamine having the general formula: $H_2N(CH_2)_n NH$, wherein $n$ is an integral number more than 4.

The reaction is carried out carefully at low temperature, keeping the pH of the reaction mixture acidic while dropping alkylenediamine alcoholic solution in cyanogen halide solution. A mixed solution of alcohol and ether is used as a solvent. The alcohol to be used should be saturated aliphatic alcohol (example, methanol, ethanol, propanol, isopropanol, butanol, etc.). Particularly good results can be obtained by using isopropanol.

It is also desirous that the reaction temperature be restricted to less than room temperature, for instance a temperature of 5–10° C. is considered most appropriate.

In regard to the method of separating the substances obtained by the reaction, after the completion of the reaction, the crystals of alkylenediamine salt which separates are filtered while the filtrate is concentrated as soon as possible under reduced pressure at low temperature (30–50° C.) and if the resulting concentrate is dropped into cold water while stirring continuously, alkylenedicyanamide will be gradually obtained in the form of white crystals. These crystals are filtered off and vacuum-dried at low temperature. The yield is almost quantitative. Recrystallization can be made easily by utilizing alcohol and ketone.

Alkylenedicyanamide is generally obtained in the form of white crystals (tetramethylenedicyanamide and pentamethylenedicyanamide are in liquid form). These white crystals have melting points below 100° C. and are easily soluble in alcohol and ketone but not in water, ether or benzene, etc.

When these compounds are kept in a melted form, it was found that pH of the liquid changes from acidic into alkaline, and at the same time, the liquid causes heat generation and polymerization, resulting in a colorless transparent and hard new polymer which can be utilized widely in various fields.

The polymerization of alkylenedicyanamide can be greatly accelerated by the existence of a small amount of amines. Consequently, in manufacturing alkylenedicyanamide, care must be taken to maintain the liquid always in an acidic condition, and not allow it to turn alkaline. At the same time, in order to remove the by-produced alkylenediamine salt as soon as possible from the reaction mixture it is necessary to use a suitable solvent, for example, a mixed solution of isopropanol and ether.

If there is a small amount of alkylenediamine salt in the alkylenedicyanamide together with the solvent, it would become difficult to crystallize alkylenedicyanamide. Therefore, if the reaction product is added dropwise into cold water while stirring continuously, pure crystals of alkylenedicyanamide will gradually be formed and the alkylenediamine salt completely removed.

Through this method, the inventors, have succeeded in obtaining hexamethylenedicyanamide whose M.P. is 64–65° C., heptamethylenedicyanamide, M.P. 60–61° C., octamethylenedicyanamide, M.P. 71–73° C., nonamethylenedicyanamide, M.P. 42° C. and decamethylenedicyanamide, M.P. 74–76° C. All of these compounds are pure crystals. The inventors succeeded in obtaining these compounds for the first time.

According to the method listed in the aforementioned H. Dreyfus' patent, reaction of hexamethylenediamine with sodium cyanide 10% water solution was carried out at less than 40° C. while dropping benzene solution of bromine. This results in the fact that the reaction is always carried out in alkaline condition which in turn induces the previously mentioned side reaction. Consequently, it is considerably difficult to manufacture pure hexamethylenedicyanamide by this method.

Thus, the inventors have succeeded in obtaining a new and useful compound which can be easily and inexpensively manufactured in its pure form.

*Experimental 1*

10.6 g. (0.10 mole) of cyanogen bromide (or 6.2 g. (0.10 mole) of cyanogen chloride) was dissolved in a mixed solvent of 32 cc. ether and 35 cc. isopropanol. While cooling this solution at 5–10° C. and continuously stirring, a solution of 11.0 g. (0.095 mole) of hexamethylenediamine in 33 cc. of isopropanol was gradually added dropwise. The hexamethylenediamine dihydrobromide (or dihydrochloride) formed as a by-product of the reaction was then filtered off and washed with isopropanol. The filtrate combined with wash was concentrated at less than 50° C. at diminished pressure. The resulting concentrate was added gradually to 30 cc. of water (below 10° C.) while stirring continuously to obtain crystals of hexamethylenedicyanamide. The crystals were treated in ice water with stirring, filtered, washed with cold water and dried in a vacuum dessicator. Yield 7.0 g., 89%, M.P. 61–63° C. When recrystallized from alcohol, the melting point was 64–65° C.

*Experimental 2*

10.6 g. (0.10 mole) of cyanogen bromide (or 6.2 g. (0.10 mole) of cyanogen chloride) was dissolved in a mixed solvent of 43 cc. ether and 43 cc. isopropanol. While cooling this solution at 5–10° C. and continuously stirring, a solution of 12.3 g. (0.095 mole) of heptamethylenediamine in 43 cc. of isopropanol was gradually added dropwise. The heptamethylenediamine dihydrobromide (or dihydrochloride) formed as a by-product of the reaction was then filtered off and washed with isopropanol. The filtrate combined with wash was concentrated at less than 50° C. at diminished pressure. The resulting concentrate was added gradually to 30 cc. of water (below 10° C.) while stirring continuously to obtain crystals of heptamethylenedicyanamide. The crystals were treated in ice water with stirring, filtered, washed with cold water and dried in a vacuum desiccator. Yield 6.7 g., 78%, M.P. 60–62° C.

*Experimental 3*

10.6 g. (0.10) mole of cyanogen bromide (or 6.2 g. (0.10 mole) of cyanogen chloride) was dissolved in a mixed solvent of 48 cc. ether and 48 cc. isopropanol. While cooling this solution at 5–10° C. and continuously stirring, a solution of 13.7 g. (0.095 mole) of octamethylenediamine in 48 cc. of isopropanol was gradually added dropwise. The octamethylenediamine dihydrobromide (or dihydrochloride) formed as a by-product of the reaction was then filtered off and washed with isopropanol. The filtrate combined with wash was concentrated at less than 50° C. at diminished pressure. The resulting concentrate was added gradually to 30 cc. of water (below 10° C.) while stirring continuously to obtain crystals of octamethylenedicyanamide. The crystals were treated in ice water with stirring, filtered, washed with cold water and dried in a vacuum desiccator. Yield 8.0 g., 87%, M.P. 73–74° C.

*Experimental 4*

10.6 g. (0.10 mole) of cyanogen bromide (or 6.2 g. (0.10 mole) of cyanogen chloride) was dissolved in a mixed solvent of 53 cc. ether and 53 cc. isopropanol. While cooling this solution at 5–10° C. and continuously stirring, a solution of 15.0 g. of nonamethylenediamine (0.095 mole) in 53 cc. of isopropanol was gradually added dropwise. The nonamethylenediamine dihydrobromide (or dihydrochloride) formed as a by-product of the reaction was then filtered off and washed with isopropanol. The filtrate combined with wash was concentrated at less than 50° C. at diminished pressure. The resulting concentrate was added gradually to 30 cc. of water (below 10° C.) while stirring continuously to obtain crystals of nonamethylenedicyanamide. The crystals were treated in ice water with stirring, filtered, washed with cold water and dried in a vacuum desiccator. Yield 8.1 g., 82%, M.P. 40–42° C.

*Experimental 5*

10.6 g. (0.10 mole) of cyanogen bromide (or 6.2 g. (0.10 mole) of cyanogen chloride) was dissolved in a mixed solvent of 58 cc. ether and 58 cc. isopropanol. While cooling this solution at 5–10° C. and continuously stirring, a solution of 16.4 g. (0.095 mole) of decamethylenediamine in 58 cc. of isopropanol was gradually added dropwise. The decamethylenediamine dihydrobromide (or dihydrochloride) formed as a by-product of the reaction was then filtered off and washed with isopropanol. The filtrate combined with wash was concentrated at less than 50° C. at diminished pressure. The resulting concentrate was added gradually to 30 cc. of water (below 10° C.) while stirring continuously to obtain decamethylenedicyanamide crystals. The crystals were treated in ice water with stirring, filtered, washed with cold water and dried in a vacuum desiccator. Yield 9.2 g., 87%, M.P. 75–76° C.

*Experimental 6*

10.6 g. (0.10 mole) of cyanogen bromide (or 6.2 g. (0.10 mole) of cyanogen chloride) was dissolved in mixed solvent of 22 cc. ether and 22 cc. isopropanol. While cooling this solution at 5–10° C. and continuously stirring, a solution of 8.4 g. (0.095 mole) of tetramethylenediamine in 22 cc. of isopropanol was gradually added dropwise. The tetramethylenediamine dihydrobromide (or dihydrochloride) formed as a by-product of the reaction was then filtered off and washed with isopropanol. The filtrate combined with wash was concentrated at less than 50° C. at diminished pressure. The resulting concentrate was added gradually to 30 cc. of water (below 10° C.) while stirring continuously to obtain colorless oil of tetramethylenedicyanamide. The oily layer was separated and treated in ice water to remove diamine salt. The oil was again separated, washed with cold water and dried in a vacuum desiccator. Yield 5.9 g., 90%. Tetramethylenedicyanamide is obtained as a colorless viscous liquid.

*Experimental 7*

10.6 g. (0.10 mole) of cyanogen bromide (or 6.2 g. (0.10 mole) of cyanogen chloride) was dissolved in mixed solvent of 27 cc. ether and 27 cc. isopropanol. While cooling this solution at 5–10° C. and continuously stirring, a solution of 9.7 g. (0.095 mole) of pentamethylenediamine in 27 cc. of isopropanol was gradually added dropwise. The pentamethylenediamine dihydrobromide (or dihydrochloride) formed as a by-product of the reaction was then filtered off and washed with isopropanol. The filtrate combined with wash was concentrated at less than 50° C. at diminished pressure. The resulting concentrate was added gradually to 30 cc. of water (below 10° C.) while stirring continuously to obtain colorless oil of pentamethylenedicyanamide. The oily layer was separated and treated in ice water to remove diamine salt. The oil was again separated, washed with cold water and dried in a vacuum desiccator. Yield 6.4 g., 88%. Pentamethylenedicyanamide is obtained as a colorless viscous liquid.

We claim:

1. A process of producing a compound of the formula $$NCNH(CH_2)_nNHCN$$

wherein $n$ is an integer of at least 4, said process comprising reacting a cyanogen halide with an alkylenediamine of the formula $$NH_2(CH_2)_nNH_2$$

by dissolving the alkylenediamine in a solvent of lower aliphatic alcohol and adding the obtained solution dropwise into a solution of a cyanogen halide in a mixed solvent containing ether and a lower aliphatic alcohol and while cooling the latter solution to a temperature below 20° C. and continuously stirring the same, filtering from the reacted solutions crystals of alkylenediamine salt, concentrating the filtrate at a temperature less than 50° C. by vaporizing the organic solvent at reduced pressure, adding the thus obtained concentrate gradually to water at a temperature below 10° C. while continuously stirring to obtain substantially pure alkylenedicyanamide in solid crystal form while any unreacted cyanogen halide and alkylenediamine salt remains dissolved in an aqueous phase.

2. A process as claimed in claim 1 wherein said cyanogen halide is selected from the group consisting of cyanogen chloride and cyanogen bromide.

3. A process as claimed in claim 1 wherein the lower aliphatic alcohol both for the mixed solvent and the solvent for the alkylenediamine is isopropanol.

4. A process as claimed in claim 1 wherein the alkylenediamine and cyanogen halide are in an equimolar ratio.

5. A process as claimed in claim 1 wherein the mixed solvent is cooled to a temperature between 5 and 10° C.

References Cited in the file of this patent

UNITED STATES PATENTS

| | | |
|---|---|---|
| 2,194,076 | Roblin | Mar. 19, 1940 |
| 2,349,851 | Dreyfus | May 30, 1944 |

OTHER REFERENCES

Sugino et al.: Journal of Organic Chemistry, vol. 26, pages 4122 to 4123 (October 24, 1961, cf. page 3619).